US009642074B2

(12) United States Patent
Shi et al.

(10) Patent No.: US 9,642,074 B2
(45) Date of Patent: May 2, 2017

(54) MANAGING PERFORMANCE OF A SMALL CELL SEARCH FUNCTION IN A MULTI-SUBSCRIPTION MULTI-STANDBY COMMUNICATION DEVICE

(71) Applicant: QUALCOMM Incorporated, San Diego, CA (US)

(72) Inventors: Yongsheng Shi, San Diego, CA (US); Sitaramanjaneyulu Kanamarlapudi, San Diego, CA (US); Dhananjaya Sarma Ponukumati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 14/814,553

(22) Filed: Jul. 31, 2015

(65) Prior Publication Data

US 2017/0006530 A1 Jan. 5, 2017

(30) Foreign Application Priority Data

Jan. 30, 2015 (IN) .......................... 3331/CHE/2015

(51) Int. Cl.
*H04W 48/16* (2009.01)
*H04W 36/30* (2009.01)
(Continued)

(52) U.S. Cl.
CPC ....... *H04W 48/16* (2013.01); *H04W 36/0022* (2013.01); *H04W 36/28* (2013.01); *H04W 36/30* (2013.01); *H04W 88/06* (2013.01)

(58) Field of Classification Search
CPC ..... H04W 48/16; H04W 36/30; H04W 36/28; H04W 36/0022; H04W 88/06
(Continued)

(56) References Cited

U.S. PATENT DOCUMENTS 5,903,840 A * 5/1999 Bertacchi .......... H04W 36/0088
370/332
7,321,764 B2 * 1/2008 Hong ..................... H04W 76/06
370/329
(Continued)

OTHER PUBLICATIONS

3GPP TS 36.304: "3rd Generation Partnership Project, Technical Specification Group Radio Access Network, Evolved Universal Terrestrial Radio Access (E-UTRA), User Equipment (UE) procedures in idle mode (Release 12)", 3GPP Standard, 3rd Generation Partnership Project (3GPP), Mobile Competence Centre, 650, Route Des Lucioles, F-06921 Sophia-Antipolis Cedex, France, vol. RAN WG2, No. V12.4.0, XP050928020, Mar. 23, 2015, pp. 1-38, [retrieved on Mar. 23, 2015] Chapters 4.2, 5.2.1-5.2.4.9, 5.6, 6.
(Continued)

*Primary Examiner* — Sharad Rampuria
(74) *Attorney, Agent, or Firm* — The Marbury Law Group, PLLC

(57) ABSTRACT

Embodiments include systems and methods for managing performance of a small cell search function during an active communication session via a first subscription in a multi-subscription multi-standby communication device. A device processor may perform a first tune away to a second subscription to receive first small cell information, and may tune back to the first subscription after receiving the first small cell information to resume the active communication session. The device processor may perform a second tune away to the second subscription to receive second small cell information, and may tune back to the first subscription after receiving the second small cell information to resume the active communication session. The device processor may select one of the first small cell and the second small cell for cell reselection based on the first small cell information and the second small cell information.

22 Claims, 7 Drawing Sheets

(51) Int. Cl.
*H04W 88/06* (2009.01)
*H04W 36/00* (2009.01)
*H04W 36/28* (2009.01)

(58) Field of Classification Search
USPC .................................. 455/434–444, 552.1
See application file for complete search history.

(56) References Cited

U.S. PATENT DOCUMENTS

| | | | |
|---|---|---|---|
| 7,809,367 B2* | 10/2010 | Hellaker | G08G 1/20 370/310.2 |
| 8,843,139 B2 | 9/2014 | Yu et al. | |
| 8,958,847 B2 | 2/2015 | Sanka et al. | |
| 2009/0239533 A1 | 9/2009 | Somasundaram et al. | |
| 2013/0260761 A1* | 10/2013 | Walke | H04W 60/005 455/436 |
| 2013/0295920 A1* | 11/2013 | Viswanadham | H04W 36/14 455/426.1 |
| 2013/0303181 A1 | 11/2013 | Rajurkar et al. | |
| 2015/0057046 A1* | 2/2015 | Challa | H04W 4/001 455/558 |
| 2015/0079988 A1 | 3/2015 | Su et al. | |
| 2015/0099528 A1 | 4/2015 | Hu et al. | |
| 2015/0133130 A1 | 5/2015 | Gupta et al. | |

OTHER PUBLICATIONS

Ericsson: "Dual-SIM Dual-Standby UEs and their Impact on the RAN", 3GPP Draft, R2-115375 Dual-Sim Dual-Standby Use and their Impact on the Ran, 3rd Generation Partnership Project (3GPP), Mobile Competence Centre, 650, Route Des Lucioles, F-06921 Sophia-Antipolis Cedex, France, vol. RAN WG2, No. Zhuhai, 20111010, Oct. 3, 2011 (Oct. 3, 2011), XP050540879, pp. 1-3, [retrieved on Oct. 3, 2011].
International Search Report and Written Opinion—PCT/US2016/033197—ISA/EPO—Jul. 28, 2016.

* cited by examiner

MANAGING PERFORMANCE OF A SMALL CELL SEARCH FUNCTION IN A MULTI-SUBSCRIPTION MULTI-STANDBY COMMUNICATION DEVICE

RELATED APPLICATIONS

This application claims the benefit of Indian Provisional Patent Application No. 3331/CHE/2015 entitled "Managing Performance Of A Small Cell Search Function In A Multi-Subscription Multi-Standby Communication Device," filed Jun. 30, 2015, the entire contents of which are herein incorporated by reference for all purposes.

BACKGROUND

Wireless devices having multiple subscriber identity modules (SIMs) may communicate with two or more cells of a wireless network. Some multi-subscription multi-standby communication devices may allow two or more network interfaces or subscriber identity modules (SIMs) to share a single radio frequency (RF) resource (e.g., dual-SIM dual-standby, or "DSDS" devices). However, the RF resource in such devices can only tune to a single network at a time. The multi-subscription multi-standby communication device may employ a "tune-away" procedure to monitor multiple interfaces in a standby mode by tuning to one network in a primary cell, quickly tuning away to the second network in a second cell for a short time, and then tuning back to the first network to continue a voice or data call. This tune-away procedure may allow the multi-subscription multi-standby communication device to monitor for pages or other indications of incoming messages or data received on the second network. However, tuning away to another network may interrupt communications with the first network, and may reduce throughput of communications between the first network and the multi-subscription multi-standby communication device.

The multi-subscription multi-standby communication device may also use a tune-away procedure to receive signals from other cells for cell selection or reselection, as well as to monitor signals other than bearer or control signals from two or more communication networks. For example, base stations of wireless communication networks may broadcast system information messages, such as master information blocks (MIBs) and system information blocks (SIBs), which the multi-subscription multi-standby communication device may use to establish communication with a particular base station, such as during cell selection or cell reselection. For example, system information messages may include scheduling information, a frame offset indication, a number of segments, a repetition rate of system information, and other information that the multi-subscription multi-standby communication device may use to establish communication with a base station.

SUMMARY

Various embodiments include methods and multi-subscription multi-standby communication devices implementing methods for managing performance of a small cell search function during an active communication session via a first subscription. Various embodiments may include performing a first tune away to a second subscription to receive first small cell information from a first small cell, tuning back to the first subscription after receiving the first small cell information on the second subscription to resume the active communication session on the first subscription, performing a second tune away to the second subscription to receive second small cell information from a second small cell, tuning back to the first subscription after receiving the second small cell information to resume the active communication session, and selecting one of the first small cell and the second small cell for cell reselection based on the first small cell information and the second small cell information.

In some embodiments, performing a first tune away to a second subscription to receive the first small cell information from the first small cell may include suspending the active communication session on the first subscription. In some embodiments, performing the second tune away to the second subscription to receive the second small cell information from the second small cell may include suspending the active communication session on the first subscription. In some embodiments, selecting one of the first small cell and the second small cell for cell reselection based on the first small cell information and the second small cell information may include ranking the first small cell and the second small cell based on the first small cell information and the second small cell information. Some embodiments may further include selecting one of the first small cell and the second small cell for cell reselection based on the ranking. Some embodiments may further include performing cell reselection to the selected one of the first small cell and the second small cell.

Various embodiments may also include suspending an active communication session via a macro cell on a first subscription, performing a tune away to a second subscription to receive first small cell information from a first small cell, tuning back to the first subscription after receiving the first small cell information on the second subscription to resume the active communication session on the first subscription, determining whether a signal from the first small cell exceeds a signal threshold, and performing cell reselection to the first small cell in response to determining that the signal from the first small cell exceeds the signal threshold. In some embodiments, performing cell reselection to the first small cell in response to determining that the signal from the first small cell exceeds the signal threshold may further include selecting for cell reselection the first small cell in response to determining that the signal from the first small cell exceeds the signal threshold.

Some embodiments may further include suspending performance of tune aways to the second subscription. Some embodiments may further include determining whether the active communication session has ended, receiving second small cell information from one or more other small cells in response to determining that the active communication session has ended, and ranking the first small cell and the one or more other small cells based on the first small cell information and the second small cell information. Some embodiments may further include selecting one of the first and the one or more other small cells for cell reselection based on the ranking, and performing cell reselection to the selected one of the first and the one or more other small cells. Some embodiments may further include initializing a timer in response to determining that the signal from the first small cell does not exceed the signal threshold, determining whether the timer has elapsed, selecting another small cell from the one or more other small cells in response to determining that the timer has elapsed, and performing a tune away to the second subscription to receive second small cell information from the selected another small cell.

Various embodiments further include a multi-subscription multi-standby communication device having a memory, a radio frequency (RF) resource, and a processor coupled to the memory and the RF resource and configured with processor executable instructions to perform operations of the methods described above. Various embodiments include a multi-subscription multi-standby communication device having means for performing functions of the methods described above. Various embodiments include a non-transitory processor-readable storage medium having stored thereon processor-executable instructions configured to cause a processor of a multi-subscription multi-standby communication device to perform operations of the methods described above.

BRIEF DESCRIPTION OF THE DRAWINGS

The accompanying drawings, which are incorporated herein and constitute part of this specification, illustrate exemplary embodiments. Together with the general description given above and the detailed description given below, the drawings serve to explain features of the various embodiments, and not to limit the various embodiments.

DETAILED DESCRIPTION

Figure 1:
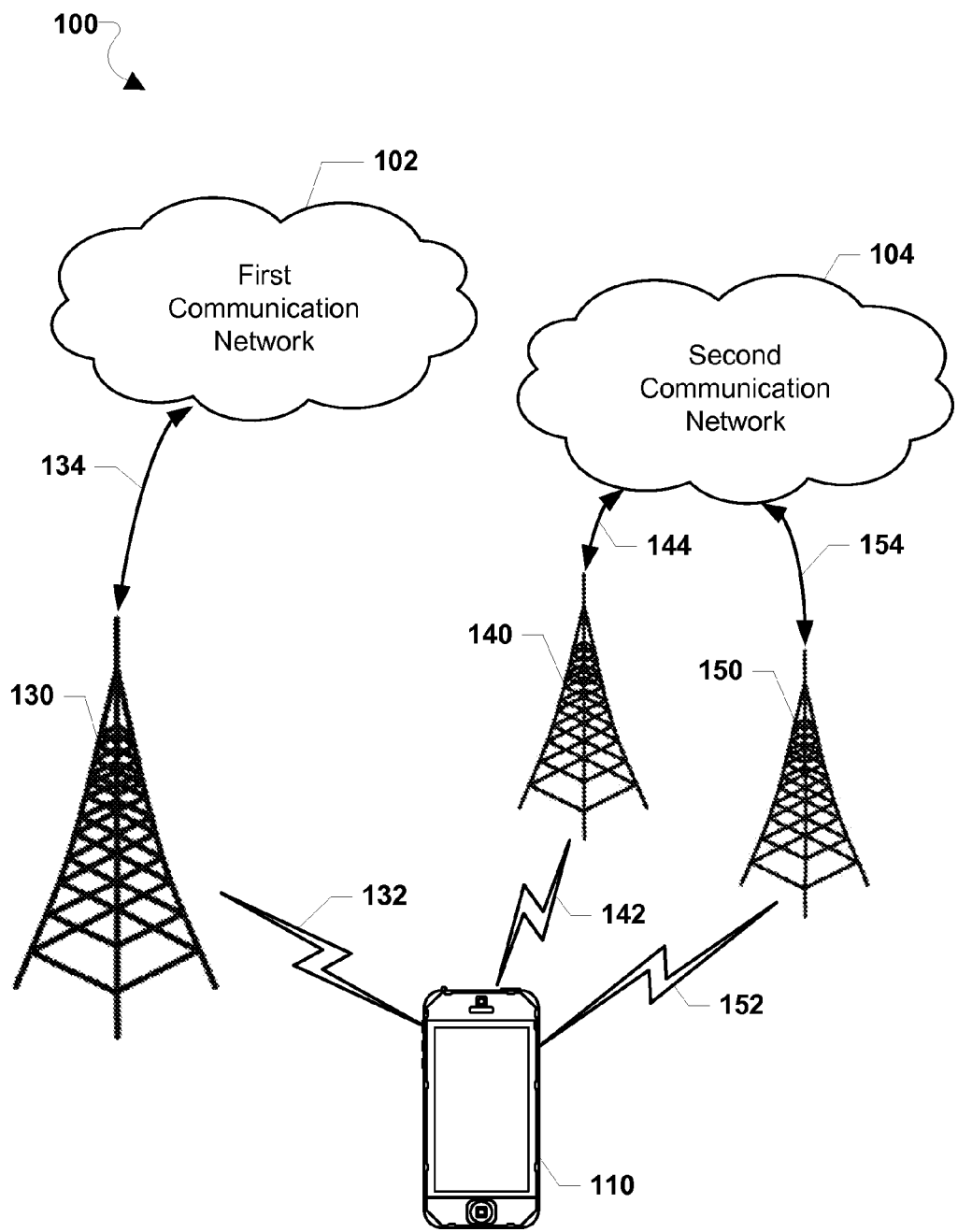
FIG. 1 is a component block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods implemented in multi-subscription multi-standby communication devices that enable managing the performance of a small cell search function to receive signals from one or more small cells in a manner that reduces the impact of the search function on an active communication session.

The term "multi-subscription multi-standby (MSMS) communication device" refers to any one or all of cellular telephones, smartphones, personal or mobile multi-media players, personal data assistants, laptop computers, tablet computers, smartbooks, palmtop computers, wireless electronic mail receivers, multimedia Internet enabled cellular telephones, wireless gaming controllers, and similar electronic devices and portable computing platforms that include a programmable processor, a memory, and a shared radio frequency (RF) resource, and are configured to support two or more subscriptions. Various embodiments may be particularly useful in any communication devices that can support multiple wireless wide area network subscriptions and receive cell broadcasts via the shared RF resource.

The terms "component," "module," "system," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on an MSMS communication device and the MSMS communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

To support multiple subscriptions, a multi-subscription multi-standby communication device may employ a tune-away procedure to monitor multiple interfaces using a single shared RF resource in which the shared RF resource is tuned to a first network (i.e., tuned to a carrier signal associated with the first network), subsequently tuned away to a second network for a short time (i.e., tuning to another carrier signal of the second network), and then tuned back to the first network to continue a voice or data call. This tune-away procedure may enable the multi-subscription multi-standby communication device to monitor system information from two or more communication networks. The tune-away procedure may also allow the multi-subscription multi-standby communication device to support an active call on a first subscription with a first network while monitoring for pages or other indications of incoming messages or data on a second subscription received from a second network.

Some network providers may extend the coverage of macro cells by deploying a Closed Subscriber Group (CSG) of a plurality of small cells (e.g., smaller base stations, such as femtocells or picocells) that a group of subscribers (sometimes a closed group) may access. For example, such small cells may be deployed in coverage holes or other areas of weak coverage within a coverage area of a macro cell. The small cells may also be deployed just beyond the coverage area of the macro cell, to extend network coverage.

A multi-subscription multi-standby communication device may obtain a list of CSGs associated with macro cells, and use this list to identify small cells with which service may be obtained. The multi-subscription multi-standby communication device may obtain this list of CSGs from a number of sources, such as from a macro cell with which the multi-subscription multi-standby communication device has established communication, from another network element of a communication network, by scanning for signals from small cells in the vicinity, or by another process. When the communication device establishes communication with a macro cell and determines that the macro cell has an associated or proximate group of small cells (such as a CSG), the communication device may periodically scan signals of the small cells using a search function to determine whether to select one of the smaller cells for cell selection or cell reselection. For example, multi-subscription multi-standby communication device may periodically scan signals of the CSG member cells using a search function, such as an autonomous search function (ASF), to determine whether one of the smaller cells provides better performance (e.g., greater signal strength) than the current cell with which the device is communicating.

A multi-subscription multi-standby communication device may use a tune-away procedure to scan for signals from small cells. The multi-subscription multi-standby communication device may, for example, measure signal strength or signal quality of the signals. The multi-subscription multi-standby communication device may also receive system information from the small cells, such as master information blocks (MIBs) and system information blocks (SIBs), that the multi-subscription multi-standby communication device may use to establish communication with a particular small cell, such as during cell selection or cell reselection. The system information messages may include scheduling information, a frame offset indication, a number of segments, a repetition rate of system information, and other information that the multi-subscription multi-standby communication device may use to establish communication with a small cell.

Problems may arise when a multi-subscription multi-standby communication device is conducting an active communication session on a first subscription (such as a packet switched communication session or another active communication session) and the multi-subscription multi-standby switches to a second subscription to perform the small cell search function. The small cell search function may be relatively time-consuming, and thus could require so much time that the active call on the first subscription is dropped. For example, when the multi-subscription multi-standby communication device is highly mobile (e.g., in a moving vehicle), by the time the device has completed scanning all of the nearby small cells, signals received from the macro cell may be insufficient to support the active communication session (i.e., a signal strength is too low, a data rate is insufficient, an error rate is too high, or another characteristic of the macro cell signals). Further, if the multi-subscription multi-standby communication device defers performing the search function until the active communication session has ended, the multi-standby communication device may move out of the coverage area of the macro cell and may miss an opportunity to perform cell reselection to a small cell.

Various embodiments provide methods implemented by a processor in a multi-subscription multi-standby communication device that may manage performance of a small cell search function. A multi-subscription multi-standby communication device that is conducting an active communication session via a macro cell on a first subscription may determine to perform a small cell search function to receive signals and small cell information from one or more small cells. The small cell information may include one or more information blocks, such as a master information block (MIB) or a system information block (SIB). In various embodiments, the multi-subscription multi-standby communication device may limit the performance of the small cell search function to reduce the impact of the search function on the active communication session.

In various embodiments, the multi-subscription multi-standby communication device may stagger the performance of the small cell search function in order to limit the duration of any single tune-away from the active communication session. The multi-subscription multi-standby communication device may temporarily suspend the active communication session on the first subscription to perform a tune away (i.e., tune away its radio resource) to a first small cell signal, and resume the active communication session after receiving first small cell information from a first small cell instead of scanning for another small cell signal.

After a period of time supporting the active communication session, the multi-subscription multi-standby communication device may tune away to receive the small cell information of a second subscription, and then tune back to the first subscription to continue supporting the active communication session after receiving the second small cell information from the second small cell. This process or temporarily tuning-away to one small cell to receive small cell information, resuming the active communication session for a time, temporarily tuning away to one small cell to receive small cell information, and tuning back to resuming the active communication session for a time may be repeated until small cell information is received from all small cells in a list or with adequate signal strength, after which the multi-standby communication device may determine whether a cell reselection to one of the small cells should be conducted. The multi-subscription multi-standby communication device may make this determination by ranking the plurality of small cells based on their respective small cell information, and selecting one of the small cells for cell reselection based on its rank and measurements.

In various embodiments, after tuning the radio resource back to the first subscription (and/or resuming the active communication session on the first subscription), the multi-subscription multi-standby communication device may initialize a timer having a particular duration, and after the timer elapses the multi-subscription multi-standby communication device may tune away its radio resource to a second (or to another) small cell signal. In various embodiments, the multi-subscription multi-standby communication device may dynamically determine the timer duration. Dynamic determination of the timer duration may enable the receipt of sufficient small cell information while mitigating inaccuracies in the reception of the small cell information. For example, if the timer duration is too long, the communication devices measurements may be inaccurate, and a highly mobile communication device may move out of effective communication range with the macro cell; if the timer duration is too short, performance of the small cell search function may degrade the quality and/or performance of the active communication session.

In various embodiments, the processor may determine the timer duration based on a mobility of the multi-subscription multi-standby communication device (e.g., a speed, a location, and/or other factors). The processor may also determine the timer duration based on an uplink data buffer status of the multi-subscription multi-standby communication device, such as whether the multi-subscription multi-standby communication device has data buffered for transmission to the macro cell, a quantity of data that is buffered, and/or a priority level of the buffered data. The processor may also determine the timer duration based on data transmission characteristics, such as whether data transmission from the multi-subscription multi-standby communication device is relatively continuous or relatively bursty. For example, a rate of data transmission may be relatively constant (i.e., within a threshold over a period of time), or may be relatively variable (i.e., exceeds a threshold over a period of time).

References to "first network," "first subscription," "second network" and "second subscription" herein are arbitrary and are used to refer to two or more subscriptions/networks generally because at any given time either subscription/network may be in an active mode (on an active voice or data call) or a standby mode, and all subscriptions/networks may need to monitor for system information (e.g., for network SIB transmissions). Also, references to "first" and "second" subscriptions and networks are not intended to imply that the embodiments are limited to two subscriptions sharing one RF resource, because three or more subscriptions may share one RF resource provided that only one subscription can use the RF resource at a time. Third and fourth subscriptions would behave similar to a second subscription. Therefore, in the interest of brevity, operations of subscriptions in the standby mode that share the RF resource during tune-away periods are described generally with reference to the "second" subscription.

Various embodiments may be implemented within a variety of communication systems 100, such as systems that include at least two mobile communication networks, an example of which is illustrated in FIG. 1. A first communication network 102 and a second communication network 104 each may include a plurality of cellular base stations (e.g., a first base station 130, a second base station 140, and a third base station 150). A multi-subscription multi-standby communication device 110 may communicate with the first communication network 102 through a communication link 132 to the first base station 130. The multi-subscription multi-standby communication device 110 may also communicate with the second communication network 104 through a communication link 142 to the second base station 140 and through a communication link 152 to the third base station 150. The first base station 130 may communicate with the first communication network 102 over a wired or wireless communication link 134, the second base station 140 may communicate with the second communication network 104 over a wired or wireless communication link 144, and the third base station 150 may communicate with the second communication network 104 over a wired or wireless communication link 154. The communication links 134, 144, 154 may include fiber optic backhaul links, microwave backhaul links, and other similar communication links.

In various embodiments, the first base station 130 may be a macro cell, such as a large cellular communication base station or other access point, and the second and third base stations 140, 150 may be small cells, such as femtocells, picocells, or other relatively smaller base stations or access points. For example, a network operator may deploy the second and third base stations 140, 150 to extend the coverage area of the first base station 130. In various embodiments, the second and third base stations 140, 150 may be members of a CSG. While FIG. 1 illustrates only the second and third base stations 140, 150, the communication systems 100 may include additional base stations (i.e., a fourth base station, a fifth base station, etc.) without limitation.

Each of the communication networks 102 and 104 may support communications using one or more radio access technologies, and each of the communication links 132, 134, 142, 144, 152, and 154 may include cellular connections that may be made through two-way wireless communication links using one or more radio access technologies (RATs). Examples of RATs may include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), and other RATs. While the communication links 132, 134, 142, 144, 152, and 154 are illustrated as single links, each of the communication links may include a plurality of frequencies or frequency bands, each of which may include a plurality of logical channels. Additionally, each of the communication links 132, 134, 142, 144, 152, and 154 may utilize more than one RAT.

Figure 2:
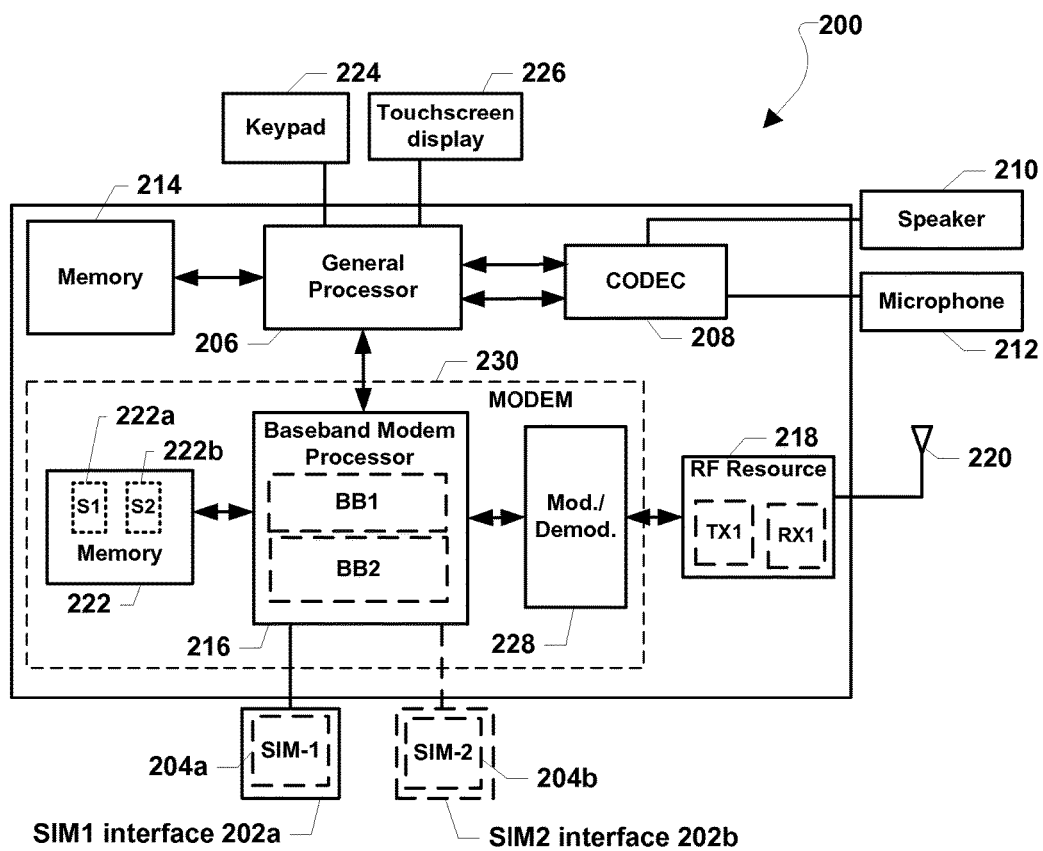
FIG. 2 is a component block diagram of a multi-subscription multi-standby communication device according to various embodiments.

FIG. 2 is a component block diagram of a multi-subscription multi-standby communication device 200 suitable for implementing various embodiments. With reference to FIGS. 1 and 2, in various embodiments, the multi-subscription multi-standby communication device 200 may be similar to the multi-subscription multi-standby communication device 110. The multi-subscription multi-standby communication device 200 may include a first SIM interface 202a, which may receive a first identity module SIM-1 204a that is associated with a first subscription. The multi-subscription multi-standby communication device 200 may optionally also include a second SIM interface 202b, which may receive a second identity module SIM-2 204b that is associated with a second subscription.

A SIM in various embodiments may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The multi-subscription multi-standby communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to an RF resource 218 for transmission. The modulator/demodulator 228 may also extract an informationbearing signal from a modulated carrier wave received from the RF resource 218, and may provide the demodulated signal to the baseband modem processor 216. The modulator/demodulator 228 may be or include a digital signal processor (DSP).

The baseband modem processor 216 may read and write information to and from the memory 222. The memory 222 may also store instructions associated with a protocol stack, such as protocol stack S1 222a and protocol stack S2 222b. The protocol stacks S1 222a, S2 222b generally include computer executable instructions to enable communication using a radio access protocol or communication protocol. Each protocol stack S1 222a, S2 222b typically includes network protocol layers structured hierarchically to provide networking capabilities. The modem 230 may include one or more of the protocol stacks S1 222a, S2 222b to enable communication using one or more RATs. The protocol stacks S1 222a, S2 222b may be associated with a SIM card (e.g., SIM-1 204a, SIM-2 204b) configured with a subscription. For example, the protocol stack S1 222a and the protocol stack S2 222b may be associated with the SIM-1 204a. The illustration of only two protocol stacks S1 222a, S2 222b is not intended as a limitation, and the memory 222 may store more than two protocol stacks (not illustrated).

Each SIM and/or RAT in the multi-subscription multi-standby communication device 200 (e.g., SIM-1 204a, SIM-2 204b) may be coupled to the modem 230 and may be associated with or permitted to use the RF resource 218. In some embodiments, the RF resource 218 may share a common baseband modem processor 216 to perform baseband/modem functions for all RATs on the multi-subscription multi-standby communication device. In some embodiments, the RF resource 218 may include the physically or logically separate baseband processors (e.g., BB1, BB2).

The RF resource 218 may include transceivers associated with one or more RATs and may perform transmit/receive functions for the mobile communication device 200 on behalf of their respective RATs. The RF resource 218 may include separate transmit and receive circuitry. The RF resource 218 may be coupled to a wireless antenna (e.g., the wireless antenna 220). The RF resource 218 may also be coupled to the modem 230 (e.g., via the modulator/demodulator 228, or alternatively via the baseband modem processor 216 or another component).

In some embodiments, the general-purpose processor 206, memory 214, baseband processor(s) 216, and the RF resource 218 may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224 and a touchscreen display 226.

In some embodiments, the keypad 224, the touchscreen display 226, the microphone 212, or a combination thereof may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-subscription multi-standby communication device 200 to enable communication between them.

Functioning together, the two SIMs 204a, 204b, the baseband processor(s) 216, RF resource 218 and the antenna 220 may enable communications on two or more RATs. For example, one SIM, baseband processor and RF resource may be configured to support two different RATs. In other embodiments, more RATs may be supported on the multi-subscription multi-standby communication device 200 by adding more SIM cards, SIM interfaces, RF resources, and antennas for connecting to additional mobile networks.

Figure 3:
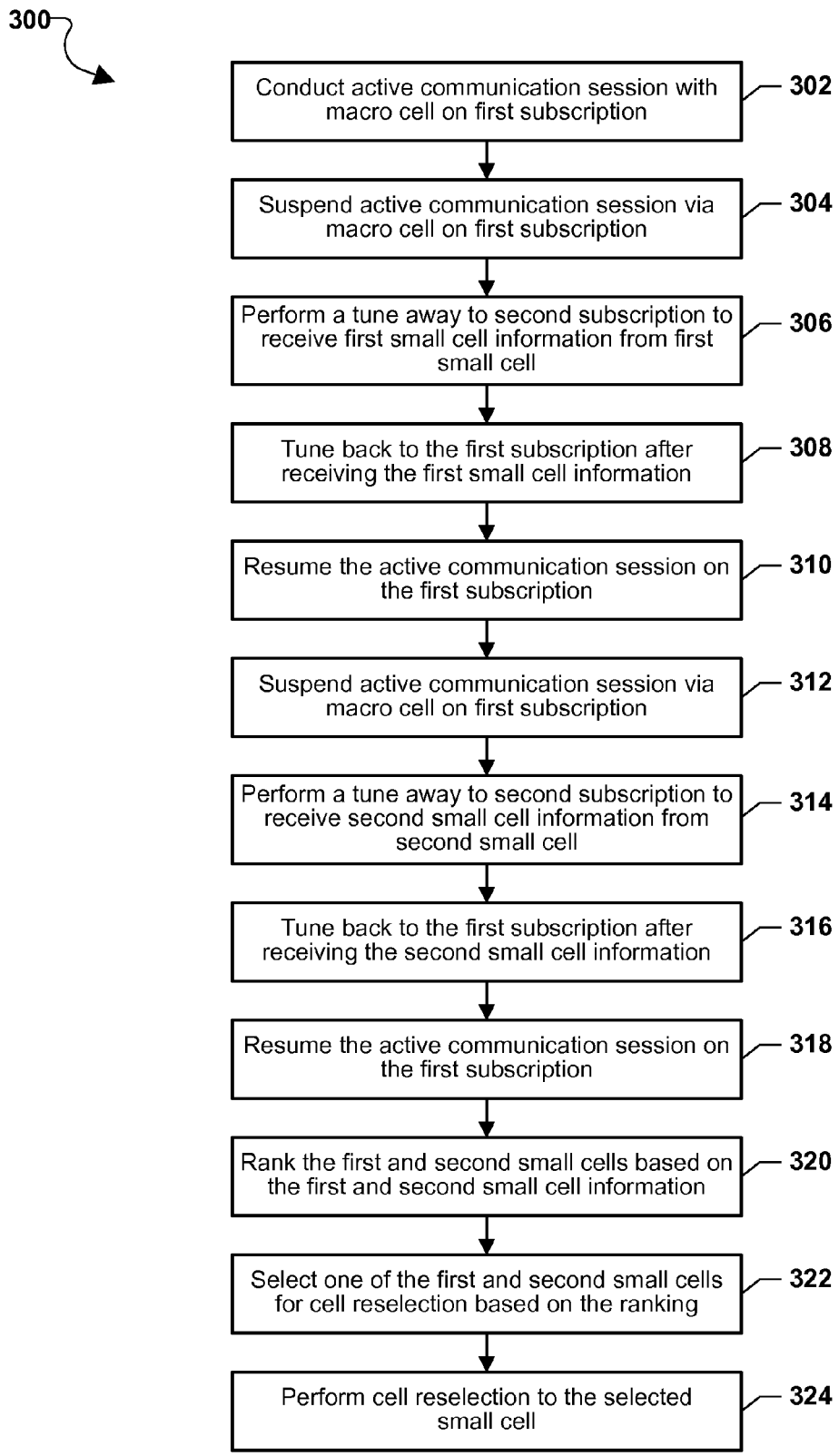
FIG. 3 is a process flow diagram illustrating a method for managing performance of a small cell search function in a multi-subscription multi-standby communication device according to various embodiments.

FIG. 3 illustrates a method 300 for managing performance of a small cell search function in a multi-subscription multi-standby communication device according to some embodiments. With reference to FIGS. 1-3, the method 300 may be implemented by a multi-subscription multi-standby communication device (e.g., the multi-subscription multi-standby communication device 110, 200), such as under the control of a processor (e.g., the general-purpose processor 206, the baseband processor 216, a separate controller, and/or the like) executing operations of the method.

In block 302, the multi-subscription multi-standby communication device may conduct an active communication session with a macro cell (e.g., the first base station 130) on a first subscription. Some network providers may extend and/or supplement the coverage area of macro cells by deploying one or more small cells near a macro cell. A multi-subscription multi-standby device may include a list of small cells associated with the macro cell, and the multi-subscription multi-standby device may periodically scan signals of the small cells to determine whether to select one of the smaller cells for cell selection or cell reselection.

In block 304, the multi-subscription multi-standby device may suspend the active communication session via the macro cell on the first subscription. In block 306, the multi-subscription multi-standby device may perform a tune away to a second subscription to receive first small cell information from a first small cell (e.g., the base station 140). The multi-subscription multi-standby device may receive the first small cell system information from the first small cell on the second subscription, such as master information blocks (MIBs) and/or system information blocks (SIBs).

In block 308, the multi-subscription multi-standby device may tune back to the first subscription after receiving the first small cell information on the second subscription. In block 310, the multi-subscription multi-standby device may resume the active communication session on the first subscription.

In block 312, the multi-subscription multi-standby device may again suspend the active communication session via the macro cell on the first subscription. In block 314, the multi-subscription multi-standby device may perform a tune away to the second subscription to receive a second small cell information from a second small cell (e.g., the base station 150). The multi-subscription multi-standby device may receive second small cell system information from the second small cell on the second subscription.

In block 316, the multi-subscription multi-standby device may tune back to the first subscription after receiving the second small cell information on the second subscription. In block 318, the multi-subscription multi-standby device may resume the active communication session on the first subscription.

In block 320, the multi-subscription multi-standby device (e.g., a processor thereof) may rank the first and second small cells based on the first and second small cell information. In block 322, the device processor may select one of the first and second small cells for cell reselection based on the ranking. In block 324, the multi-subscription multi-standby device may perform the cell reselection to the selected small cell.

Figure 4:
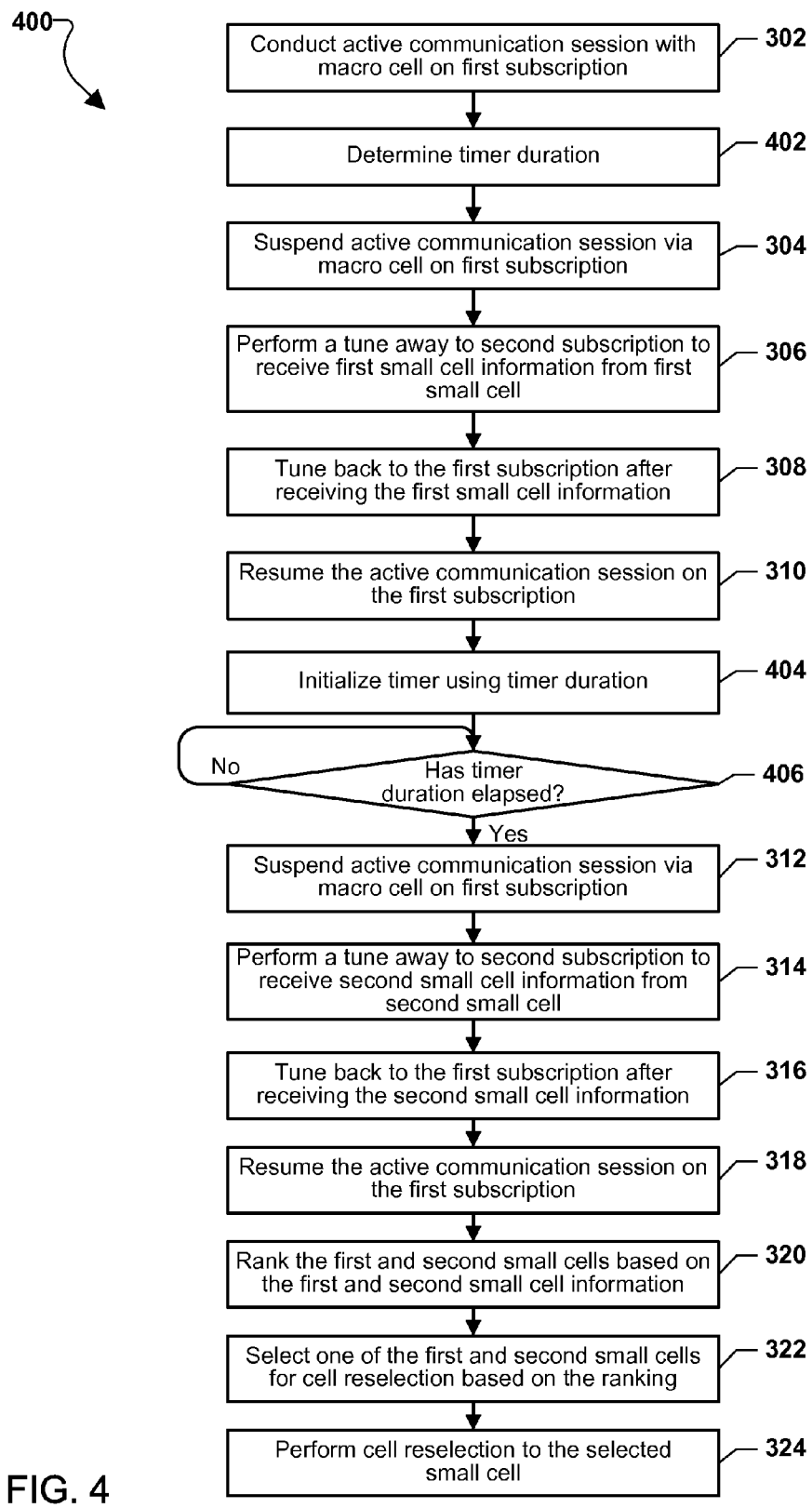
FIG. 4 is another process flow diagram illustrating a method for managing performance of a small cell search function in a multi-subscription multi-standby communication device according to various embodiments.

FIG. 4 illustrates a method 400 for a method for managing performance of a small cell search function in a multi-subscription multi-standby communication device according to some embodiments. With reference to FIGS. 1-4, the method 400 may be implemented by a multi-subscription multi-standby communication device (e.g., the multi-subscription multi-standby communication device 110, 200), such as under the control of a processor (e.g., the general-purpose processor 206, the baseband processor 216, a separate controller, and/or the like) executing operations of the method.

In blocks 302-324, the multi-subscription multi-standby communication device may perform operations of like numbered blocks of the method 300 as described.

In block 402, the device processor may determine a timer duration. The device processor may use the timer duration to stagger or delay the performance of the small cell search function to reduce the impact of the small cell search function on the active communication session. In various embodiments, the device processor may dynamically determine the timer duration. Dynamic determination of the timer duration enables the receipt of sufficient small cell information while mitigating inaccuracies in the reception of the small cell information. For example, if the timer duration is too long, the communication devices measurements may be inaccurate, and a highly mobile communication device may move out of effective communication range with the macro cell; if the timer duration is too short, performance of the small cell search function may degrade the quality and/or performance of the active communication session.

In various embodiments, the device processor may determine the timer duration, in block 402, based on a mobility of the multi-subscription multi-standby communication device (e.g., a speed, a location, and/or other factors). For example, the device processor may determine the mobility of the multi-subscription multi-standby communication device using Global Positioning System (GPS) data, base station triangulation, information received from the first and/or second communication network, or another similar mobility determination process. The processor may also (or alternatively) determine the timer duration based on an uplink data buffer status of the multi-subscription multi-standby communication device, such as whether the multi-subscription multi-standby communication device has data buffered for transmission to the macro cell, a quantity of data that is buffered, and/or a priority level of the buffered data. The processor may also (or alternatively) determine the timer duration based on data transmission characteristics of data transmitted from the multi-subscription multi-standby communication device, such as whether data transmission from the multi-subscription multi-standby communication device is relatively continuous or relatively bursty. For example, a relatively continuous rate of data transmission may be relatively constant (i.e., a variation in the rate of data transmission is within a threshold over a period of time). As another example, a relatively bursty rate of data transmission may be relatively variable (i.e., a variation in the rate of data transmission exceeds a threshold over a period of time).

In block 310, the multi-subscription multi-standby communication device may resume the active communication session on the first subscription. In block 404, the device processor may initialize a timer using the timer duration. In determination block 406, the device processor may determine whether the timer duration has elapsed. So long as the timer duration has not elapsed (i.e., determination block 406="No"), the multi-subscription multi-standby communication device may remain on the first subscription (i.e., during the timer duration) and may continue monitoring the timer duration.

In response to determining that the timer duration has elapsed (i.e., determination block 406="Yes"), the device processor may cause the multi-subscription multi-standby communication device to suspend the active communication session via a macro cell on the first subscription, in block 312. Thus, the device processor may use the timer duration to stagger or delay the performance of the small cell search function to reduce the impact of the small cell search function on the active communication session.

Figure 5:
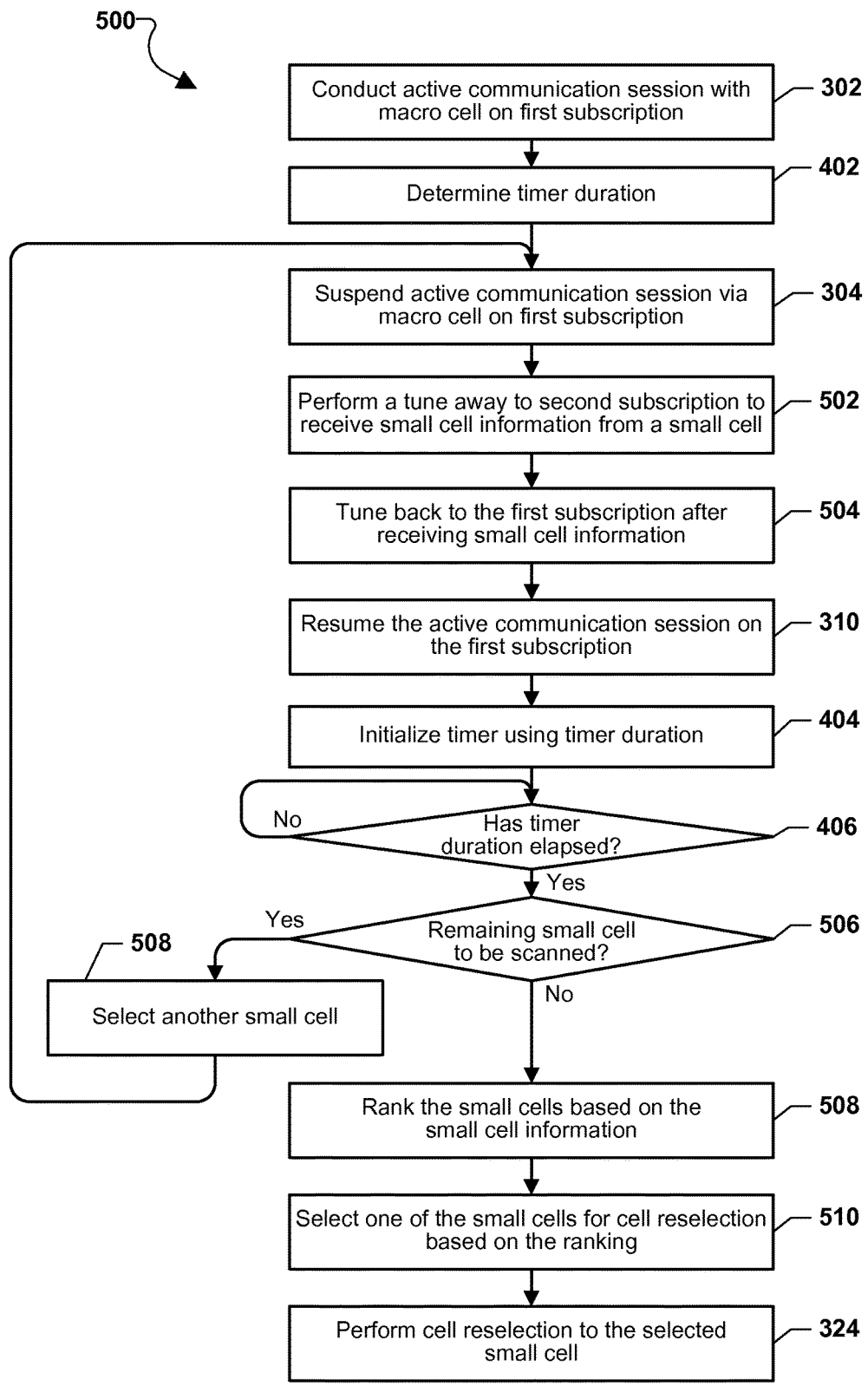
FIG. 5 is another process flow diagram illustrating a method for managing performance of a small cell search function in a multi-subscription multi-standby communication device according to various embodiments.

FIG. 5 illustrates a method 500 for a method for managing performance of a small cell search function in a multi-subscription multi-standby communication device (e.g., the multi-subscription multi-standby communication device 110, 200 in FIGS. 1 and 2) according to some embodiments. With reference to FIGS. 1-5, the method 500 may be implemented by a multi-subscription multi-standby communication device (e.g., the multi-subscription multi-standby communication device 110, 200), such as under the control of a processor (e.g., the general-purpose processor 206, the baseband processor 216, a separate controller, and/or the like) executing operations of the method. In various embodiments, the method 500 may be performed in a communication system that includes a plurality of small cells that are deployed in or near the coverage area of a macro cell.

In blocks 302-324 and 402-406, the multi-subscription multi-standby communication device may perform operations of like numbered blocks of the method 300 and the method 400 as described.

In block 302, the multi-subscription multi-standby communication device may conduct an active communication session with a macro cell on a first subscription. In block 402, the device processor may determine a timer duration. In block 304, the multi-subscription multi-standby communication device may suspend the active communication session via the macro cell on the first subscription.

In block 502, the multi-subscription multi-standby communication device may perform a tune away to a second subscription to receive small cell information from a small cell (e.g., the base station 140). In various embodiments, the device processor may select the small cell from among a plurality of small cells. In various embodiments, the device processor may identify the plurality of small cells from one or more identifiers of the small cells on the multi-subscription multi-standby communication device. The small cell identifiers may, for example, be stored in a memory of the multi-subscription multi-standby communication device as a data structure, such as a list, an array, a document, a spreadsheet, or another data structure, In block 504, the multi-subscription multi-standby communication device may tune back to the first subscription after receiving the small cell information on the second subscription. In block 310, the multi-subscription multi-standby communication device may resume the active communication session on the first subscription.

In response to determining that the timer duration has elapsed (i.e., determination block 406 ="Yes"), the device processor may determine whether any small cell remains to be scanned (i.e., whether the device has not yet received small cell information from any small cell), in determination block 506. In response to determining that there is a small cell remaining to be scanned (i.e., determination block 506 ="Yes"), the device processor may select another small cell from among the plurality of small cells, in block 508, and the multi-subscription multi-standby communication device may again perform the operations of blocks 304-506 as described.

In response to determining that there are no more small cells remaining to be scanned (i.e., determination block 506 ="No"), the device processor may rank the small cells based on the small cell information that was received by the device processor, in block 508. In block 510, the device processor may select one of the small cells for cell reselection based on the ranking. In block 324, the multi-subscription multi-standby communication device may perform the cell reselection to the selected small cell.

Figure 6:
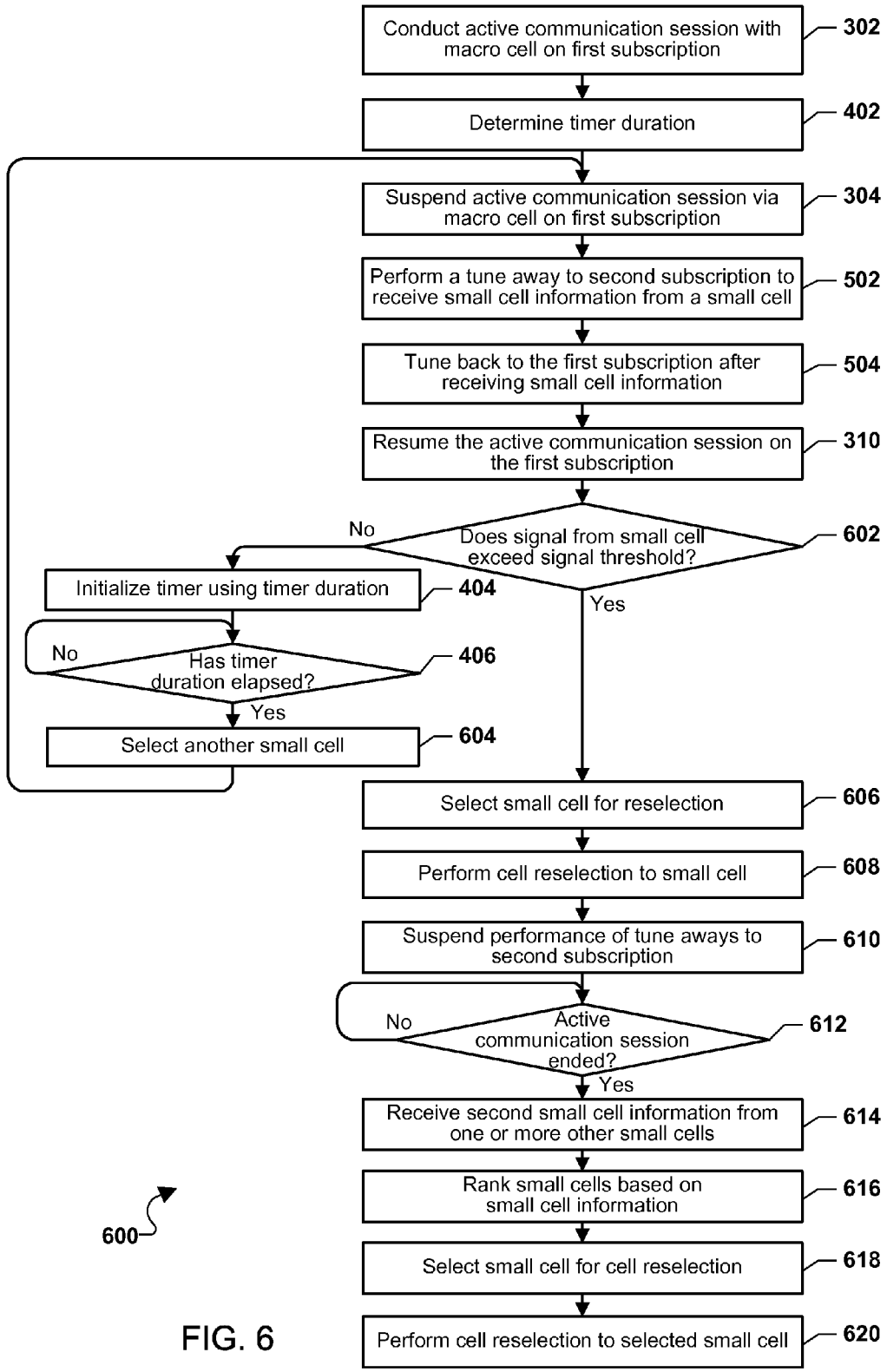
FIG. 6 is another process flow diagram illustrating a method for managing performance of a small cell search function in a multi-subscription multi-standby communication device according to various embodiments.

FIG. 6 illustrates a method 600 for a method for managing performance of a small cell search function in a multi-subscription multi-standby communication device according to some embodiments. With reference to FIGS. 1-6, the method 600 may be implemented by a multi-subscription multi-standby communication device (e.g., the multi-subscription multi-standby communication device 110, 200), such as under the control of a processor (e.g., the general-purpose processor 206, the baseband processor 216, a separate controller, and/or the like) executing operations of the method. In the method 600, in order to mitigate the impact of the performance of the small cell search function on the active communication session, the device processor may select for cell reselection a small cell that can support a threshold level of communications for the multi-subscription multi-standby communication device, and may delay scanning of any remaining small cells.

In blocks 302-324, 402-406, 502, and 504, the multi-subscription multi-standby communication device may perform operations of like numbered blocks of the methods 300, 400 and 500 as described.

Following resumption of the active communication session on the first subscription in block 310, the device processor may determine whether a signal from a small cell exceeds the signal threshold, in block 602. In various embodiments, the signal threshold may include a signal strength indication, a minimum data rate, a maximum data error rate, or another similar signal threshold indicating that a small cell may support a threshold level of communications for the multi-subscription multi-standby communication device. Examples of signal strength indications include a reference signal received power (RSRP), a received signal strength indicator (RSSI), a reference signal received quality (RSRQ), a channel quality indicator (CQI), or another similar signal strength indication.

In response to determining that the signal from the small cell does not exceed the signal threshold (i.e., determination block 602="No"), the device processor may initialize a timer using the timer duration, in block 404. In determination block 406, the device processor may determine whether the timer duration has elapsed. In block 604, the device processor may select another small cell (e.g., from the plurality of small cells), and the multi-subscription multi-standby communication device may again perform the operations of blocks 304-602 as described.

In response to determining that the signal from the small cell exceeds the signal threshold (i.e., determination block 602="Yes"), the device processor may select the small cell for cell reselection, in block 606. In block 608, the multi-subscription multi-standby communication device may perform the cell reselection to the selected small cell. In block 610, the multi-subscription multi-standby communication device may suspend performance of tune aways to the second subscription.

In determination block 612, the device processor may determine whether the active communication session (i.e., on the first subscription) has ended. In response to determining that the active communication session has not ended (i.e., determination block 612="No"), the device processor may continue the active communication session and redetermine whether the active communication session has ended.

In response to determining that the active communication session has ended (i.e., determination block 612="Yes"), the device processor may receive small cell information from one or more other small cells from among the plurality of small cells, in block 614. In various embodiments, the device processor may use the first and/or second subscription to receive the small cell information from the other small cells.

In block 616, the device processor may rank the plurality of small cells based on the received small cell information. In block 618, the device processor may select a small cell for cell reselection from among the ranked plurality of small cells. In block 620, the device processor may perform the cell reselection to the selected one of the first and other small cells. In some embodiments, the device processor may select the first small cell, and the device processor may remain in communication with the first small cell rather than performing cell reselection to another small cell.

Thus, in the method 600, a device processor may mitigate the impact of the performance of the small cell search function on the active communication session by selecting for cell reselection a small cell that can support a threshold level of communications for the multi-subscription multi-standby communication device, and delaying or abandoning scanning of any remaining small cells.

Figure 7:
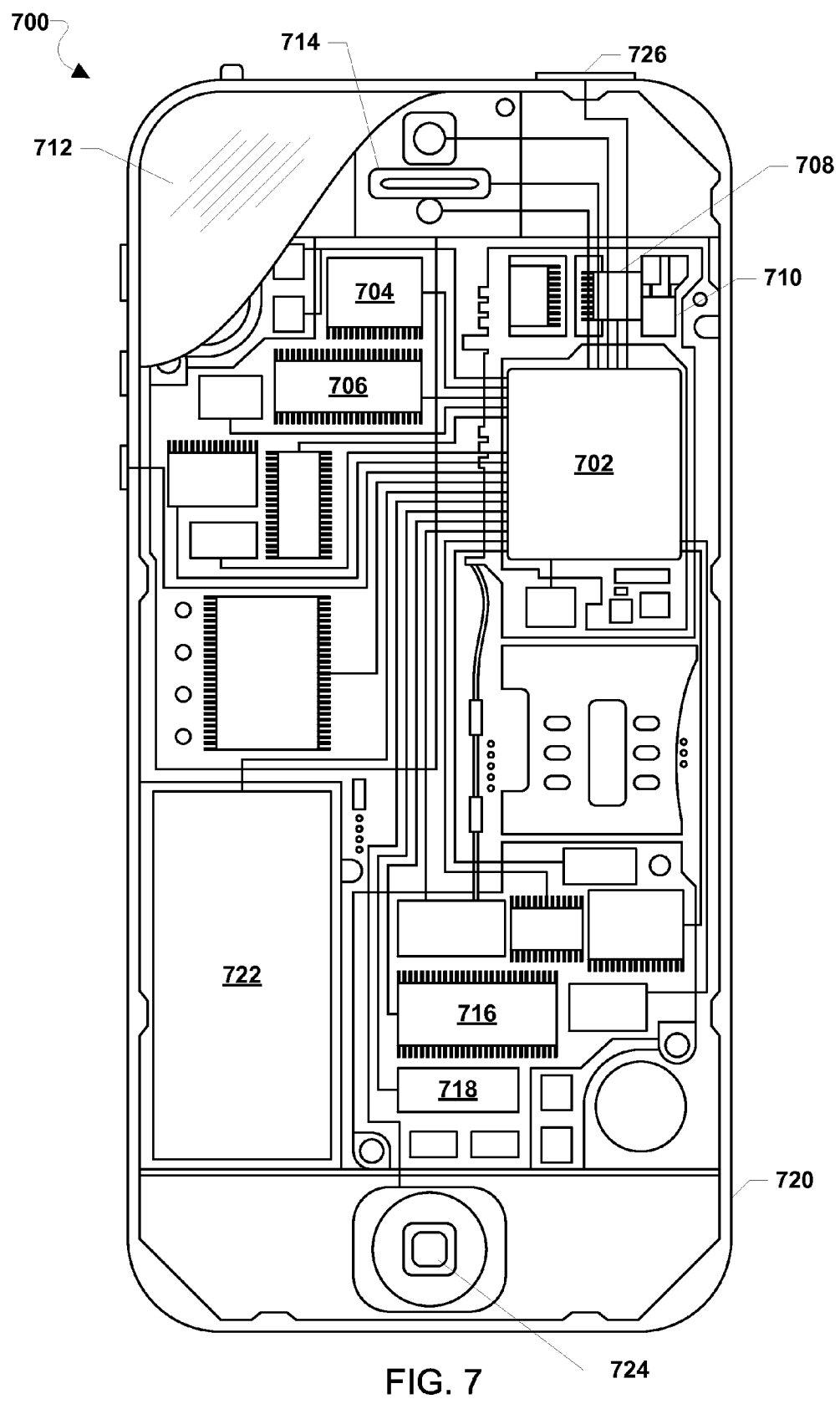
FIG. 7 is a component block diagram of a mobile communication device suitable for use with various embodiments.

Various embodiments (including, but not limited to, embodiments described with reference to FIGS. 1-6) may be implemented in any of a variety of mobile communication devices, an example of which (e.g., mobile communication device 700) is illustrated in FIG. 7. With reference to FIGS. 1-7, in various embodiments, the mobile communication device 700 (which may correspond, for example, to the multi-subscription multi-standby communication devices 110 and 200) may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile communication device 700 need not have touch screen capability.

The mobile communication device 700 may have two or more radio signal transceivers 708 (e.g., Peanut, Bluetooth, ZigBee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile communication device 700 may include one or more cellular network wireless modem chip(s) 716 coupled to the processor and antennae 710 that enables communication via two or more cellular networks via two or more radio access technologies.

The mobile communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile communication device 700 may also include speakers 714 for providing audio outputs. The mobile communication device 700 may also include a housing 720, constructed of a plastic, metal, or a combination of materials, for containing all or some of the components discussed herein. The mobile communication device 700 may include a power source 722 coupled to the processor 702, such as a disposable or rechargeable battery. The rechargeable battery may also be coupled to the peripheral device connection port to receive a charging current from a source external to the mobile communication device 700. The mobile communication device 700 may also include a physical button 724 for receiving user inputs. The mobile communication device 700 may also include a power button 726 for turning the mobile communication device 700 on and off.

The processor 702 may be any programmable microprocessor, microcomputer or multiple processor chip or chips that can be configured by software instructions (applications) to perform a variety of functions, including the functions of various embodiments described below. In some mobile communication devices, multiple processors 702 may be provided, such as one processor dedicated to wireless communication functions and one processor dedicated to running other applications. Typically, software applications may be stored in the internal memory 706 before they are accessed and loaded into the processor 702. The processor 702 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple light-weight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, the various embodiments are not intended to be limited to the embodiments shown herein but are to be accorded the widest scope consistent with the following claims and the principles and novel features disclosed herein.

What is claimed is:

1. A method for managing performance of a small cell search function during an active communication session via a first subscription in a multi-subscription multi-standby communication device, comprising:
   performing a first tune away to a second subscription to receive first small cell information from a first small cell;
   tuning back to the first subscription after receiving the first small cell information on the second subscription to resume the active communication session on the first subscription;
   initializing a timer using a timer duration after resuming the active communication session on the first subscription;
   determining whether the timer has elapsed;
   performing a second tune away to the second subscription to receive second small cell information from a second small cell in response to determining that the timer duration has elapsed;
   tuning back to the first subscription after receiving the second small cell information to resume the active communication session; and
   selecting one of the first small cell and the second small cell for cell reselection based on the first small cell information and the second small cell information.

2. The method of claim 1, wherein performing a first tune away to a second subscription to receive the first small cell information from the first small cell comprises:
   suspending the active communication session on the first subscription.

3. The method of claim 1, wherein performing the second tune away to the second subscription to receive the second small cell information from the second small cell comprises:
   suspending the active communication session on the first subscription.

4. The method of claim 1, wherein selecting one of the first small cell and the second small cell for cell reselection based on the first small cell information and the second small cell information comprises:
   ranking the first small cell and the second small cell based on the first small cell information and the second small cell information.

5. The method of claim 4, further comprising selecting one of the first small cell and the second small cell for cell reselection based on the ranking.

6. The method of claim 1, further comprising performing cell reselection to the selected one of the first small cell and the second small cell.

7. A method for managing performance of a small cell search function in a multi-subscription multi-standby communication device, comprising:
   suspending an active communication session via a macro cell on a first subscription;
   performing a tune away to a second subscription to receive first small cell information from a first small cell;
   tuning back to the first subscription after receiving the first small cell information on the second subscription to resume the active communication session on the first subscription;
   determining whether a signal from the first small cell exceeds a signal threshold;
   performing cell reselection to the first small cell in response to determining that the signal from the first small cell exceeds the signal threshold;
   initializing a timer in response to determining that the signal from the first small cell does not exceed the signal threshold;
   determining whether the timer has elapsed;
   selecting another small cell in response to determining that the timer has elapsed; and
   performing a tune away to the second subscription to receive second small cell information from the selected another small cell.

8. The method of claim 7, wherein performing cell reselection to the first small cell in response to determining that the signal from the first small cell exceeds the signal threshold comprises:
   selecting for cell reselection the first small cell in response to determining that the signal from the first small cell exceeds the signal threshold.

9. The method of claim 7, further comprising suspending performance of tune aways to the second subscription.

10. The method of claim 7, further comprising:
    determining whether the active communication session has ended;
    receiving second small cell information from one or more other small cells in response to determining that the active communication session has ended; and
    ranking the first small cell and the one or more other small cells based on the first small cell information and the second small cell information.

11. The method of claim 10, further comprising:
    selecting one of the first and the one or more other small cells for cell reselection based on the ranking; and
    performing cell reselection to the selected one of the first and the one or more other small cells.

12. A multi-subscription multi-standby communication device, comprising:
    a memory;
    a radio frequency resource; and
    a processor coupled to the memory and the radio frequency resource and configured with processor-executable instructions to:
       perform, during an active communication session via a first subscription, a first tune away to a second subscription to receive first small cell information from a first small cell;

tune back to the first subscription after receiving the first small cell information on the second subscription to resume the active communication session on the first subscription;

initialize a timer using a timer duration after resuming the active communication session on the first subscription;

determine whether the timer has elapsed;

perform a second tune away to the second subscription to receive second small cell information from a second small cell in response to determining that the timer duration has elapsed;

tune back to the first subscription after receiving the second small cell information to resume the active communication session; and select one of the first small cell and the second small cell for cell reselection based on the first small cell information and the second small cell information.

13. The multi-subscription multi-standby communication device of claim 12, wherein the processor is further configured with processor-executable instructions to:

suspend the active communication session on the first subscription.

14. The multi-subscription multi-standby communication device of claim 12, wherein the processor is further configured with processor-executable instructions to:

suspending the active communication session on the first subscription.

15. The multi-subscription multi-standby communication device of claim 12, wherein the processor is further configured with processor-executable instructions to:

ranking the first small cell and the second small cell based on the first small cell information and the second small cell information.

16. The multi-subscription multi-standby communication device of claim 15, wherein the processor is further configured with processor-executable instructions to:

select one of the first small cell and the second small cell for cell reselection based on the ranking.

17. The multi-subscription multi-standby communication device of claim 12, wherein the processor is further configured with processor-executable instructions to:

perform cell reselection to the selected one of the first small cell and the second small cell.

18. A multi-subscription multi-standby communication device, comprising:

a memory;

a radio frequency resource; and a processor coupled to the memory and the radio frequency resource and configured with processor-executable instructions to:

suspend an active communication session via a macro cell on a first subscription;

perform a tune away to a second subscription to receive first small cell information from a first small cell;

tune back to the first subscription after receiving the first small cell information on the second subscription to resume the active communication session on the first subscription;

determine whether a signal from the first small cell exceeds a signal threshold; and perform cell reselection to the first small cell in response to determining that the signal from the first small cell exceeds the signal threshold;

initializing a timer in response to determining that the signal from the first small cell does not exceed the signal threshold;

determine whether the timer has elapsed;

selecting another small cell in response to determining that the timer has elapsed; and performing a tune away to the second subscription to receive second small cell information from the selected another small cell.

19. The multi-subscription multi-standby communication device of claim 18, wherein the processor is further configured with processor-executable instructions to:

select for cell reselection the first small cell in response to determining that the signal from the first small cell exceeds the signal threshold.

20. The multi-subscription multi-standby communication device of claim 18, wherein the processor is further configured with processor-executable instructions to:

suspend performance of tune aways to the second subscription.

21. The multi-subscription multi-standby communication device of claim 18, wherein the processor is further configured with processor-executable instructions to:

determine whether the active communication session has ended;

receive second small cell information from one or more other small cells in response to determining that the active communication session has ended; and rank the first small cell and the one or more other small cells based on the first small cell information and the second small cell information.

22. The multi-subscription multi-standby communication device of claim 21, wherein the processor is further configured with processor-executable instructions to:

select one of the first and the one or more other small cells for cell reselection based on the ranking; and perform cell reselection to the selected one of the first and the one or more other small cells.

\* \* \* \* \*